July 15, 1947. W. H. RANDALL 2,424,189
PULP MOLDING DIE
Filed Nov. 11, 1942
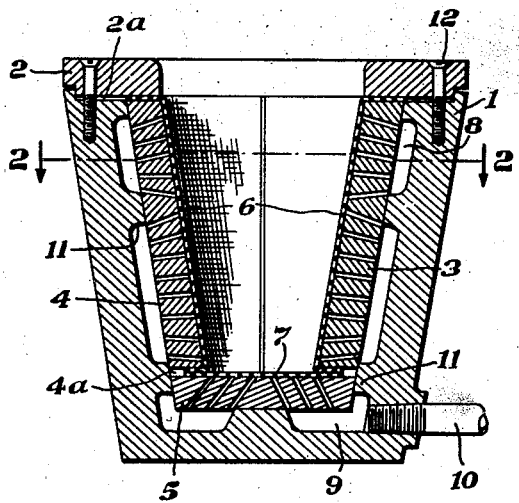
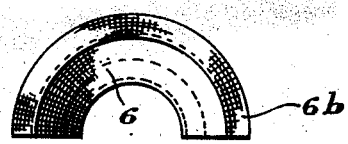
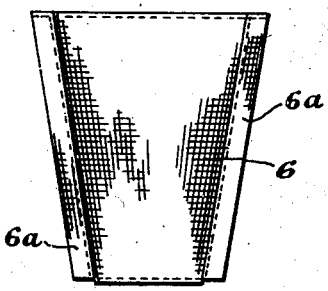
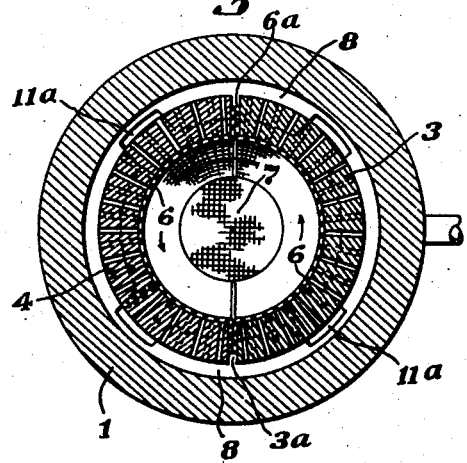
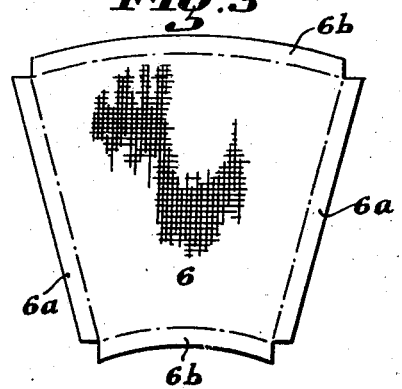
INVENTOR.
Walter H. Randall
BY Spear, Rawlings & Spear
ATTORNEYS Patented July 15, 1947

2,424,189

UNITED STATES PATENT OFFICE 2,424,189

PULP MOLDING DIE

Walter H. Randall, Waterville, Maine, assignor, by mesne assignments, to The Canal National Bank of Portland, Portland, Maine, a national banking association, and William B. Nulty, Portland, Maine, as trustees Application November 11, 1942, Serial No. 465,210

5 Claims. (Cl. 92—54)

My invention relates to a pulp molding apparatus for producing, rapidly and cheaply, thin, inclined wall, deep cavity, articles of which the familiar paper, or plastic, drinking cup may be taken as an example, and involves an open face die having its molding surface covered by a fine wire mesh drainage screen.

The primary object of the invention is to provide an inexpensive construction in which the screen, without material distortion, can readily be conformed to the die molding surface and will be fixedly retained in place during the operation of the apparatus with a minimum amount of flexing, or movement toward and away from the forming surface of the die with concomitant rupture, and in which the parts of the apparatus can be readily assembled and disassembled for facilitating the replacement of parts and particularly screen parts which may have become impaired. Other objects of the invention will become apparent from the following detailed description of one embodiment of the invention.

The invention includes primarily a die body, a sectional die supported therein with an interposed chamber communicating through perforations in the wall of the die with the interior of the latter and having a conduit leading therefrom in communication with a desired pressure source, the die sections having contiguous marginal surfaces and each section having associated with it an individual fine wire mesh screen, or other foraminous covering, retained in fixed position by marginal portions, or flanges, which are clamped by the contiguous surfaces of the die sections and by a die ring which defines the edge of the molded article and retains the assembled die sections and screen sections in the die body, and means for moving certain die sections for clamping between their lengthwise contiguous surfaces flanges at the lengthwise edges of the associated screen sections; this moving means in one form of the invention comprising ribs on the die body having downwardly and inwardly tapered edges and surfaces complemental thereto on the last named die sections.

The invention further includes the combination and construction of parts which will become apparent from the hereinafter description and appended claims.

A preferable embodiment of the invention is disclosed in the accompanying drawings, wherein:

Fig. 1 is a vertical section through a female pulp molding die in accordance with my invention.

Fig. 2 is a horizontal section on the line 2—2, of Fig. 1.

Fig. 3 is a development of one of the several blanks used to make up the mesh wire drainage surface for the sectional side wall of the die and showing the blank before it has been formed to shape and fitted to the corresponding section of the die side wall.

Fig. 4 shows in side elevation the blank of Fig. 3 shaped to fit one of the side wall sections of the die of Fig. 1.

Fig. 5 is a plan view of Fig. 4.

In the accompanying drawings the die body is designated 1, the perforated sections of the forming die, or the die proper, are designated 3, 4 and 5, the foraminous coverings, preferably of fine wire mesh, individual to the die sections, are designated 6, 6 and 7, and the die ring is designated 2. The die proper is of the open face type. The die ring, in the exemplification of the invention illustrated by the accompanying drawings, not only performs its old functions of defining the edge of the molded article and clamping the flange of the die covering, at the open end of the die, to the contiguous peripheral surface thereof, but it serves to retain in the die body the assembled die and screen sections. This action includes, in the apparatus illustrated, through the coaction of wedging surfaces on the die and die body, the clamping of flanges, at the side edges of certain screen sections, between contiguous lengthwise surfaces of adjacent side die sections, and the clamping of bottom flanges of the side screen sections and a marginal portion of the screen associated with the bottom die section between the latter and peripheral contiguous surfaces of the side die sections.

The internal faces of the perforated side wall sections 3 and 4 are individually fitted with the separate foraminous mesh wire screen or perforated metal sections 6. These conform to and provide the drainage surfaces for the side wall sections 3 and 4 of the die. Said wire sections 6 have side, or lengthwisely extending flanges 6$^a$ overlying the side edges of the sections 3 and 4 and end flanges 6$^b$ overlying the end edges of said sections 3 and 4. The internal face of the perforated bottom wall section 5 of the die is individually fitted with the separate wire mesh or perforated metal piece 7 conforming to and providing the drainage surface for said bottom section of the die.

Externally, at least portions of the sections 3 and 4 are inclined for cooperation with radial ribs or bosses 11 which project inwardly from the side wall of the body 1 so that when ring 2 is clamped in place by screws 12, the sections 3 and 4 will be wedgingly forced into the body 1 and will be contracted relative to each other, thus clamping the contiguous edges of said sections 3 and 4 tightly against the flanges 6ª of the wire sections 6 extending in the grooves 3ª between said contiguous edges (see Fig. 2). In this connection the arrangement is such that the flanges 6ᵇ of the coverings 6 at the inner ends of the sections 3 and 4 clampingly engage the marginal portion of the covering 7 in the locking space 4ª (see Fig. 1) between the lower edges of sections 3 and 4 and the bottom section 5 at approximately the same time that the flanges 6ª of said coverings clampingly engage each other. The flanges 6ᵇ of the coverings 6 at the outer ends of the sections 3 and 4 extend over the top edges of said sections 3 and 4 and are clamped thereto by said die ring 2.

The inner wall of the die body 1 is provided with spaces 8 and 9 in communication with one another by passages through the ribs or bosses 11. These spaces communicate with the die cavity by means of perforations through the walls of the die sections. A conduit 10 communicating with said spaces serves for establishing therein sub and super atmospheric conditions as desired.

The number of wire mesh or perforated metal coverings for covering the working surface of the side wall of the die may vary according to how many perforate sections 3 and 4 comprise the side wall. These pieces may be blanked out as shown in Fig. 3, and then formed to their individual shapes as shown in Figs. 3 and 4, so as to accurately fit the particular side wall section which each is to cover.

While I prefer to have the side wall of my die made up of two or more sections for convenience of assembly and simplification of forming the perforate covering therefor, it is obvious that both the perforate side wall and the wire mesh or perforate covering therefor may each be constructed as a single member instead of two or more sections. In such case the perforate side wall member would have a single longitudinal slot, equivalent to one of the spaces designated 3ª in Fig. 2 extending entirely through the molding wall. The wire mesh or perforate covering would then have a single pair of extended flanges equivalent to one of the flange pair 6ª in Fig. 2, which would be inserted and retained within said slot.

In assembling the die of Figs. 1 to 5, the perforate bottom section 5 may be first inserted in the die body, and then covered by the drainage surface consisting of the wire mesh or perforate metal section 7. The side wall pieces 3 and 4 may next be covered with their respective sections of wire mesh or perforate metal 6 and these covered sections then placed in the die, being backed up and located by the radial ribs or bosses 11, which project from the inside wall of the die body or housing 1 and are slotted as at 11ª. The die ring 2 is then placed in position and firmly secured to the die body as by the screws or equivalent fastenings 12. When fastened in position, the die ring 2 securely locks the several sections 3, 4 and 5 of the die, as well as their wire meshing coverings 6 and 7.

So long as the ring 2 is securely held in this position the entire assembly is firmly locked. To remove or change the wires, it is only necessary to remove the ring, lift out the foraminous sections, and make such replacements as desired.

The drainage from the working surface of the die is through the several mesh wire screen or perforate metal sections and through the perforations in the wall sections 3, 4 and 5 and the slots 11ª in the ring bosses 11, these slots allowing for drainage from the wall sections 3 and 4 to the bottom of the die or to drainage chamber 9.

It will be apparent to those skilled in the art that the form shown is suggestive rather than limiting and that the design and assembly may be modified in many details, without departing from the spirit and scope of my invention as defined by the appended claims.

The subject matter of the claims hereof is disclosed in my abandoned application Serial No. 174,003, filed Nov. 11, 1937.

What I therefore claim and desire to secure by Letters Patent is:

1. A pulp molding apparatus, comprising a die body having internal tapered surfaces and an open face die comprising a plurality of perforated sections assembled within said die body with their lengthwise contiguous edges in clamping relationship, said sections having individual foraminous coverings provided with lengthwise marginal extensions overlying and clamped between the contiguous edges of adjacent die sections, certain of said sections having external tapered surfaces cooperating with said internal tapered surfaces of the die body to cause said sections to contract into clamping relationship with each other when the assembly of sections and their coverings are inserted axially into said die body, and means for retaining the assembly of said die sections and covering sections against displacement.

2. A pulp molding apparatus, comprising a hollow die body having internal tapered surfaces and being open at one end, an open face die comprising perforated side and end sections assembled within said die body in substantially abutting relationship, said side sections having external tapered surfaces cooperating with said internal tapered surfaces on said die body for causing said side sections to move into contiguous relationship as they are axially inserted within said body, foraminous coverings overlying the molding surfaces of all of said sections and having marginal extensions clamped between the contiguous edges of said sections, and means for holding the die sections and foraminous coverings in fixed relationship within said die body.

3. A pulp molding apparatus, comprising a hollow die body having tapered surfaces and being open at one end, an open face die comprising perforated side sections and a perforated bottom section, a screen section individual to the die sections, those for the side sections having flanges at their lengthwise edges, the side die sections having tapered surfaces complemental to and cooperating with said tapered surfaces of said die body for causing the side sections to move into clamping relationship with the flanges aforesaid of the side screen sections as the die is moved in one direction axially of the die body, and means for fixedly retaining the die and screen sections in assembled relationship within said die body.

4. A pulp molding apparatus, comprising a hollow die body having internal tapered surfaces and having an open face die comprising perforated side sections and a perforated end section below the side sections assembled within said die body in substantially abutting relationship to one another, the side sections having external thereof tapered portions for cooperation with said internal tapered portions of said die body to cause said side sections to contract into substantially abutting relationship as they are moved in one direction axially within said body, foraminous covering sections overlying the molding surfaces of all of said die sections and having marginal extensions clamped between the contiguous surfaces of said sections, and means at the open end of the sectional die for defining the edge of the molded article and for holding all of said sections and their coverings fixedly assembled within said die body.

5. A pulp molding apparatus, comprising a hollow die body having internal ribs with axial openings having tapered edges, an open face die seated in said openings and having external tapering surfaces complemental to the edges of said rib openings, with a chamber between the die and the die body, a conduit communicating with said chamber, the die including a bottom section and side sections in substantially abutting relationship, the complemental tapered surfaces aforesaid acting to move the contiguous surfaces of said side sections into substantially abutting relationship as they are shifted axially in one direction within said body, foraminous coverings overlying the molding surfaces of all of said sections, certain of said coverings having marginal extensions clamped between the contiguous surfaces of said side sections and other marginal extensions overlying peripheral surfaces at the open face of said die, and means located at the open face of the die for clamping the last named marginal extensions of the coverings to the contiguous peripheral surfaces of the die, for defining the edge of the molded article, and for retaining the die and screen sections assembled within the die body.

WALTER H. RANDALL.

REFERENCES CITED

The following references are of record in the file of this patent:

UNITED STATES PATENTS

| Number | Name | Date |
| --- | --- | --- |
| 2,192,937 | Shepard | Mar. 12, 1940 |
| 1,774,556 | Jones | Sept. 2, 1930 |
| Re. 14,262 | Rivers | Feb. 20, 1917 |
| 202,547 | Hubbard | Apr. 16, 1878 |
| 2,326,758 | Chaplin et al. | Aug. 17, 1943 |
| 708,642 | Howard | Sept. 9, 1902 |
| 2,359,201 | Chaplin et al. | Sept. 26, 1944 |
| 1,962,656 | Hall | Jan. 12, 1934 |
| 2,346,608 | Randall | Apr. 11, 1944 |
| 1,853,349 | Hall | Apr. 12, 1932 |

FOREIGN PATENTS

| Number | Country | Date |
| --- | --- | --- |
| 488,854 | Germany | Jan. 14, 1930 |